June 12, 1951 A. SHADOWITZ ET AL 2,556,226

CENTER FREQUENCY STABILIZER FOR FREQUENCY MODULATION TRANSMITTERS

Filed May 24, 1947 2 Sheets-Sheet 1

INVENTORS
MARTIN SILVER
ALBERT SHADOWITZ
BY
R P Morris
ATTORNEY

June 12, 1951 A. SHADOWITZ ET AL 2,556,226

CENTER FREQUENCY STABILIZER FOR FREQUENCY MODULATION TRANSMITTERS

Filed May 24, 1947 2 Sheets-Sheet 2

INVENTORS
MARTIN SILVER
ALBERT SHADOWITZ

BY

R. P. Morris
ATTORNEY

Patented June 12, 1951 2,556,226

UNITED STATES PATENT OFFICE 2,556,226

CENTER FREQUENCY STABILIZER FOR FREQUENCY MODULATION TRANSMITTERS

Albert Shadowitz, Nutley, N. J., and Martin Silver, Rego Park, N. Y., assignors to International Standard Electric Corporation, New York, N. Y., a corporation of Delaware Application May 24, 1947, Serial No. 750,211

10 Claims. (Cl. 332—19)

This invention relates to radio transmitters and more especially to the frequency stabilization of radio transmitters of the frequency-modulated or frequency-shifted type.

A principal object of the invention is to provide an improved transmitter of the carrier frequency varied type, wherein a novel arrangement is provided for maintaining the center or mean reference frequency of the carrier constant.

Another object is to provide a frequency-modulated radio transmitter wherein direct modulation of the transmitted frequency is effected by the signals to be transmitted, and special means are provided for maintaining or controlling constant the mean or center frequency of the transmitter.

A feature of the invention relates to a circuit arrangement for comparing the average center frequency or mean frequency of a frequency-modulated or frequency-shifted carrier transmitter, with two standard reference frequencies, to produce a resultant monitoring or control voltage whose magnitude is directly related to any undesired shift in the normal center or mean reference frequency for which the transmitter is designed.

Another feature relates to a carrier combining network for frequency-modulated or frequency-shifted radio transmitters, which network is arranged to respond to three input radio frequencies, one frequency representing the actual center or mean reference frequency of the transmitted carrier, and the other two frequencies representing fixed and highly stabilized local radio frequencies having predetermined frequency spacings below and above the said normal center frequency of the carrier.

A further feature relates to a center frequency monitoring and/or control arrangement for radio transmitters of the frequency-modulated or frequency-shifted kind, wherein a special three-frequency input discriminator network is provided for producing a resultant D. C. monitoring or control voltage at its output which represents any departure of the said center frequency from normal.

A still further feature relates to the novel organization, arrangement and inter-connection of parts which cooperate to provide an improved radio transmitter of the frequency-modulated or frequency-shifted type.

Other features and advantages not set forth hereinabove, will be apparent after a consideration of the following detailed descriptions and the appended claims.

The invention will be described herein as embodied in a radio transmitter of the frequency-modulated type, but it will be understood that in certain of its aspects the inventive concept is equally well applicable to similar types of systems such as carrier frequency shift systems and the like.

Figure 1:
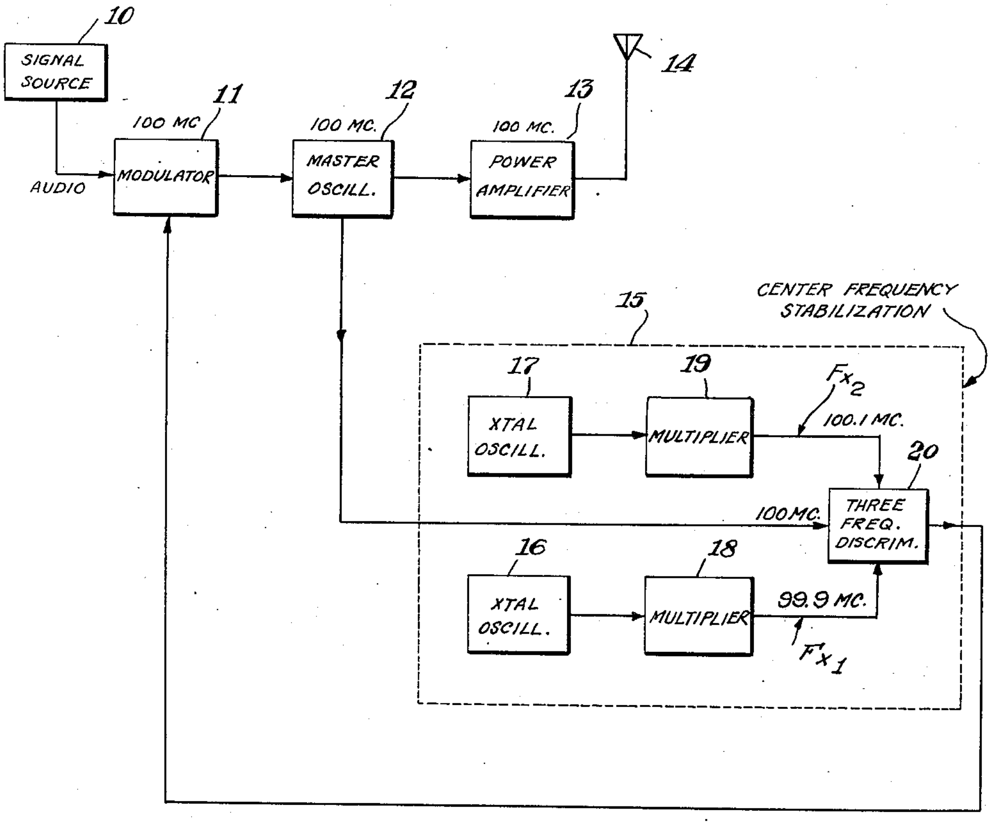
Fig. 1 is a schematic wiring diagram, in block outline form, of a frequency-modulated radio transmitter embodying the invention.

Inasmuch as the essentials of a frequency-modulated radio transmitter are well-known in the art, they are represented in the drawing by respective blocks. Thus, as shown in Fig. 1, block 10 represents any suitable form of audio frequency signal generator, e. g. voice frequency signals, telegraph signals, facsimile signals, or the like. These audio frequency signals are impressed upon a modulator device 11 which is arranged to have one or more of its electrical characteristics varied in correlation with the signals from source 10. Thus, device 11 may comprise a tank circuit having one of its elements, such as a reactance tube, varied by the signals from source 10.

The modulator 11 is associated with a master oscillator 12 having for example a normally designed frequency of one-hundred megacycles. This oscillator may be of any well-known type whose output frequency is arranged to be varied within predetermined frequency limits under control of modulator 11 and therefore under control of source 10. In the usual way, the frequency-modulated output of oscillator 12 is amplified in a suitable power amplifier 13 before being impressed upon the radiating system or antenna 14. In such a system the frequency excursions of the radiated carrier will vary between fixed limits as determined by the signals from source 10. When the system is operating properly, the radiated carrier may be considered as varying above and below a mean center or reference frequency. Thus in the system illustrated, this mean center frequency may be considered as one-hundred megacycles per second. For various reason, e. g. compliance with frequency band limits, faithfulness of signal reception, efficiency in operation, and the like, it is highly important that the mean center frequency of the transmitter be highly stabilized.

In accordance with the present invention, this stabilization is effected by employing a special three-frequency combining and discriminating unit 15 which is controlled by a portion of the carrier from the master oscillator 12, and by the two local and highly stabilized radio frequencies. For this purpose, the device 15 comprises a pair of piezo crystal controlled oscillators 16, 17, and respective frequency multipliers 18, 19. The oscillators 16, 17 are designed so that at the output of the multipliers 18, 19 there exist two separate radio frequencies, one of which is a fixed value lower than the mean center frequency of oscillator 12, and the other of which is a fixed value an equal amount higher than the said frequency of oscillator 12. Thus in the example assumed, with the oscillator 12 designed to operate at a mean center frequency of one-hundred megacycles, the output of multiplier 18 may be at 99.9 megacycles, and the output of multiplier 19 may be at 100.1 megacycles.

Associated with the multipliers is a special frequency discriminating and combining network 20 which is arranged to have simultaneously impressed thereon a portion of the carrier frequency from oscillator 12 as well as the frequencies from devices 18 and 19. As a result of the combination and frequency discrimination in device 20, there is produced at its output, a resultant D. C. voltage which can be applied to the modulator 11 to maintain the system at the proper means center or reference frequency. For example, if the device 11 uses a reactance tube, the grid bias of this tube may be varied under control of the D. C. voltage from device 20, the bias being normally such that it maintains the oscillator 12 operating at the proper mean center frequency. The manner in which the device 20 operates will be clear from an examination of the graph of Fig. 2 wherein the input frequency to device 20 is plotted against its D. C. output in volts. From Fig. 2 it will be understood that the three input frequencies $F_{x1}$, $F_{x2}$ and $F_{m0}$ produce three D. C. voltages $E_{x1}$, $E_{x2}$ and $E_{m0}$. The difference in voltage between $E_{x1}$ and $E_{m0}$ is $E_a$, while the difference in voltage between $E_{m0}$ and $E_{x2}$ is $E_b$. The voltage $E_{m0}$ will be exactly halfway between $E_{x1}$ and $E_{x2}$ for some position of $F_{m0}$ between $F_{x1}$ and $F_{x2}$, regardless of whether the operation of the device is limited to the linear portion of the discriminator curve represented in the graph. Under such a condition the difference in voltage between $E_a$ and $E_b$ will be zero. If $F_{m0}$ drifts higher in frequency, $E_a$ will become larger than $E_b$, while if $F_{m0}$ drifts lower in frequency, $E_b$ will become larger than $E_a$. The D. C. output voltage which is equal to the difference in amplitude and sign of $E_a$ and $E_b$ will therefore be a measure of the drift in oscillator 12 and can be used in any well-known manner to restore this oscillator to its normally designed center frequency.

Figure 3:
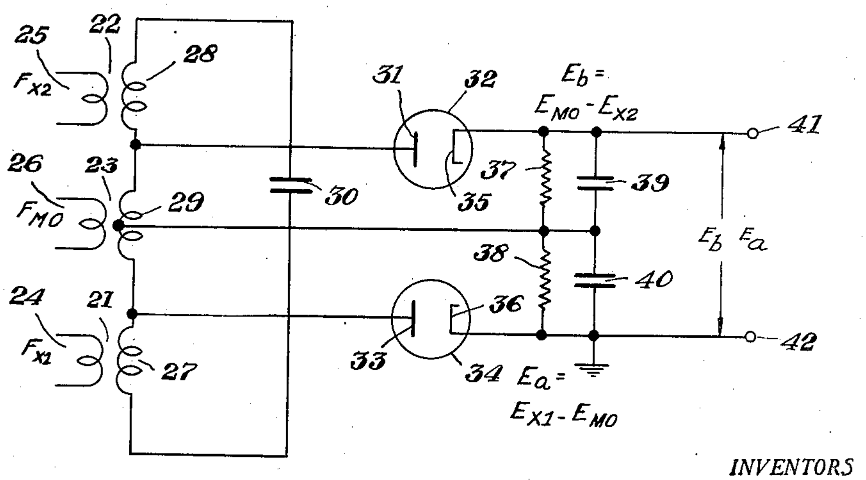
Fig. 3 is a detailed wiring diagram of the special three-frequency discriminator used in the system of Fig. 1.

Fig. 3 is a detailed wiring diagram of the three-frequency combining and discriminator device 20. It comprises three separate coupling transformers 21, 22, 23, whose primary windings 24, 25, 26, are respectively energized by the frequencies $F_{x1}$, $F_{x2}$ and $F_{m0}$. The respective secondary windings 27, 28, 29, are not mutually coupled but are connected in series and are shunted by a condenser 30 for tuning the series secondaries to a frequency which is substantially higher than any of the frequencies $F_{x1}$, $F_{x2}$ or $F_{m0}$; or which is substantially lower than any of these three frequencies. The junction point between secondaries 28, 29 is connected to the anode 31 of a rectifier tube 32. Likewise, the junction point of windings 27 and 29 is connected to the anode 33 of a rectifier tube 34. If desired, the tubes 32 and 34 may be in the form of a duo-diode within a single enclosing envelope. The cathodes 35, 36 of these rectifiers are returned through respective load resistors 37, 38 to the electrical midpoint of the winding 29. It will be understood that the windings 27, 28 and 29 are preferably all of the same inductance and number of turns as are the primaries 24, 25 and 26. Filter condensers 39 and 40 are respectively bridged across the load resistors 37 and 38 so that the resultant D. C. voltage at the terminals 41 and 42 is $E_b$—$E_a$, above described.

Figure 2:
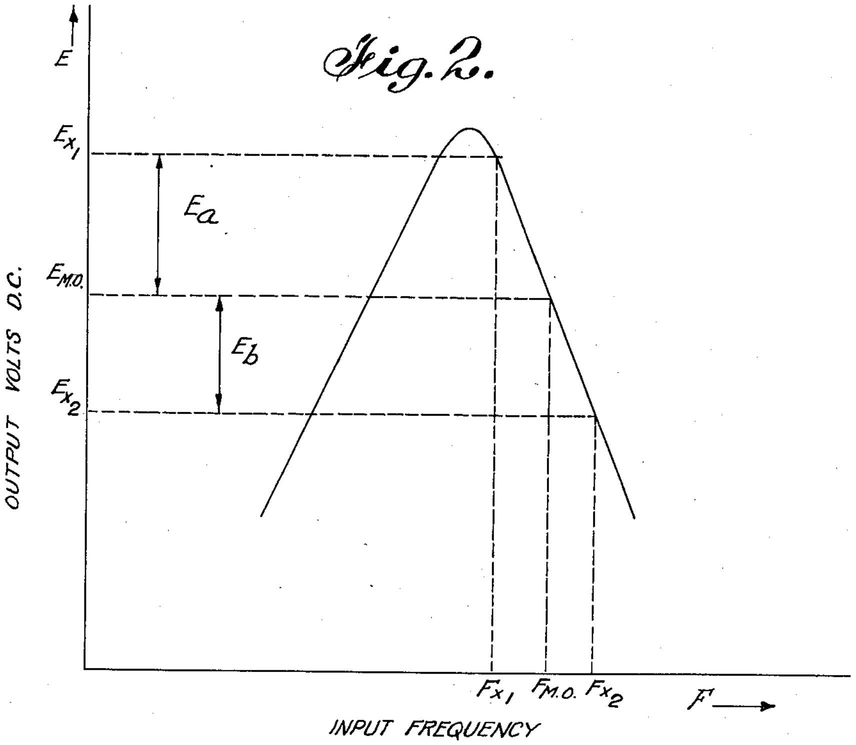
Fig. 2 is a graph explanatory of the operation of Fig. 1.

It should be observed that any accidental change in the capacity or inductances of the device 20 does not affect the stability of the mean center frequency of the system since they result merely in a shifting of the resonance curve of Fig. 2 in a higher or lower frequency direction without changing the resultant D. C. voltage $E_b$—$E_a$.

While one particular embodiment of the invention has been described, it will be understood that various changes and modifications may be made therein without departing from the spirit and scope of the invention.

Furthermore, while the invention has been described in connection with a radio transmitter, it will be understood that the device 15 may be used in controlling the frequency of any system employing a master oscillator, or the like.

What is claimed is:

1. A radio system of the type having a carrier frequency generator which has a normal reference frequency when unmodulated by signals, means to vary said frequency under control of signals, and means to produce a control voltage in proportion to undesired drift in said reference frequency, the last-mentioned means including a pair of highly stabilized local oscillators, a three-frequency discriminating network, and means to impress said carrier frequency and the frequencies derived from said oscillators simultaneously on said network.

2. A radio transmitter of the type having a carrier frequency generator which has a normal mean center frequency, means to vary the carrier frequency on either side of said center frequency under control of signals to be transmitted, a frequency discriminating network, a pair of highly stabilized local oscillators respectively producing frequencies equally above and below said center frequency, and means simultaneously impressing said carrier frequency and both said highly stabilized frequencies on said network to produce a resultant control signal which is proportional to the extent and sign of any drift in said center frequency.

3. A radio transmitter of the type having a signal-varied carrier frequency generator which has a normal mean center frequency, means to vary said carrier frequency between certain limits on either side of said center frequency, and means to inhibit undesired drift in said center frequency, the last-mentioned means comprising a frequency discriminating network, a pair of crystal controlled oscillators for deriving stabilized frequencies respectively equal amounts above and below said center frequency, means for energizing said network simultaneously and separately by the energy from said generator and oscillators, and rectifier means connected to said discriminator to produce a resultant direct voltage whose magnitude and sign are in accordance with the extent of the drift in said center frequency.

4. A radio transmitter of the type having a signal varied carrier frequency generator which has a normal mean center frequency, a modulator device for varying the frequency of said carrier with respect to said center frequency and under control of signals to be transmitted, and means to inhibit undesired drift in said center frequency, the last-mentioned means comprising a frequency discriminating network, a pair of crystal controlled oscillators for deriving stabilized frequencies respectively equal amounts above and below said center frequency, rectifier means connected to said discriminator to produce a resultant direct voltage whose magnitude and sign are in accordance with the extent of the drift in said center frequency, means for energizing said network simultaneously and separately by the energy from said generator and oscillators, and means to apply said resultant voltage to said modulator device to restore said center frequency to its normal value.

5. A radio system of the type having a carrier frequency generator with a normal reference frequency, means to vary the frequency of said carrier under control of signals, and means to produce a control signal when said normal reference frequency drifts, the last-mentioned means comprising a frequency discriminating network and means for energizing said network simultaneously and separately by the frequency from said generator and by two fixed and separate frequencies respectively equal amounts above and below said reference frequency, said network comprising a set of three inductances each respectvely energized by said center frequency and by said two separate frequencies, means connecting said inductances in circuit with a capacitance to provide a resonant point which is removed from the frequency of either of said separate frequencies and rectifier means connected to said inductances to produce a frequency discriminating signal which is correlated with the extent and direction of drift in said center frequency.

6. A radio system of the type having a carrier frequency generator with a normal reference frequency, means to vary the frequency of said carrier under control of signals, and means to produce a control signal when said normal reference frequency drifts, the last-mentioned means comprising a frequency discriminating network and means for energizing said network simultaneously and separately by the frequency from said generator and by two fixed and separate frequencies respectively equal amounts above and below said reference frequency, said network comprising a set of three coupling transformer having their primary windings energized respectively by said carrier frequency and by said separate frequencies, means connecting the secondary windings of said transformers in series, means to tune said connected secondary windings to a desired resonance point, and a pair of rectifiers connected to said secondaries to produce a resultant direct voltage which is correlated with the extent and direction of drift in said center frequency.

7. An arrangement for detecting drift in the mean center frequency of a frequency varied carrier, comprising three inductances, means interconnecting said inductances with a capacitance to provide a desired resonant characteristic, means to couple each of said inductances to three separate frequency sources one of which is at said center frequency, the second and third sources being respectively at frequencies equally above and below said center frequency.

8. An arrangement for detecting undesired drift in the mean center frequency of a frequency modulated carrier, comprising a pair of crystal controlled frequency sources, a set of three coupling transformers, one transformer having its primary excited by said mean carrier frequency, the second transformer having its primary excited by one of said crystal controlled frequencies, the third transformer having its primary excited by the other of said crystal controlled frequencies, means interconnecting the secondaries of said transformers to provide a resonant characteristic which has a substantially linear portion covering the range between the said two crystal controlled frequencies, and rectifier means connected to said secondaries to produce a resultant direct voltage whose magnitude and sign are in accordance with the extent of drift in said mean center frequency.

9. An arrangement according to claim 8 in which the secondaries of said transformers are connected in series and the series combination is shunted by a tuning condenser.

10. An arrangement according to claim 8 in which the secondaries of the three transformers are connected in series, said rectifier means including rectifiers connected in divided balanced relation across the middle one of the secondaries.

ALBERT SHADOWITZ.
MARTIN SILVER.

REFERENCES CITED

The following references are of record in the file of this patent:

UNITED STATES PATENTS

| Number | Name | Date |
|---|---|---|
| 1,889,083 | Wintringham | Nov. 29, 1932 |
| 2,279,660 | Crosby | Apr. 14, 1942 |
| 2,296,962 | Tunick | Sept. 29, 1942 |
| 2,337,214 | Tunick | Dec. 21, 1943 |
| 2,341,649 | Peterson | Feb. 15, 1944 |